Figure 1:
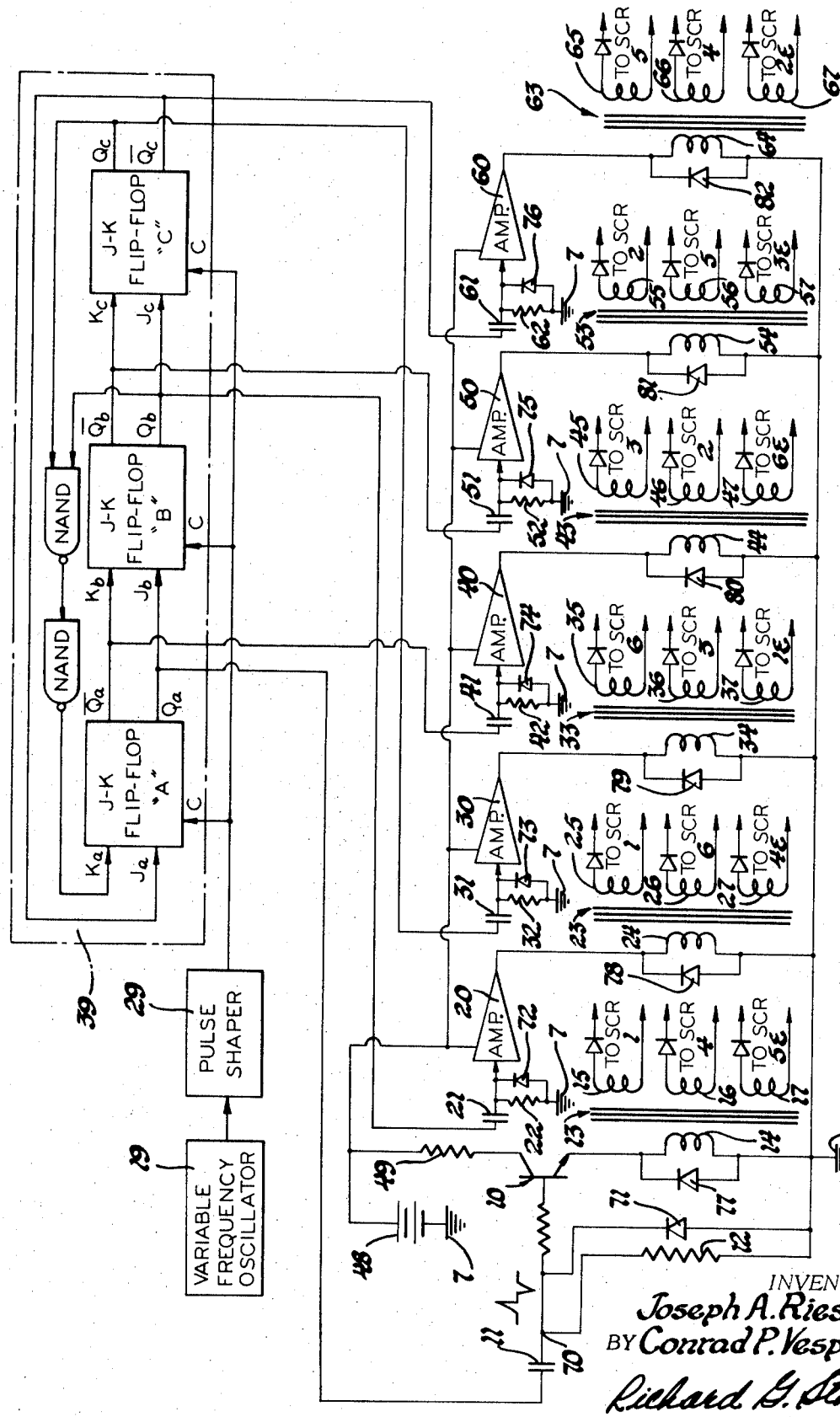

United States Patent
Riess et al.

[15] 3,701,001
[45] Oct. 24, 1972

[54] THREE-PHASE INVERTER CONTROL CIRCUIT

[72] Inventors: Joseph A. Riess, Kettering; Conrad P. Vesple, Brookville, both of Ohio

[73] Assignee: Genral Motors Corporation, Detroit, Mich.

[22] Filed: Oct. 12, 1971

[21] Appl. No.: 188,083

[52] U.S. Cl. .................................. 321/5, 318/227
[51] Int. Cl. .................................... H02m 7/48
[58] Field of Search ..................... 318/227; 321/5

[56] References Cited

UNITED STATES PATENTS

| | | | |
|---|---|---|---|
| 3,343,063 | 9/1967 | Keeney, Jr. et al. | 321/5 |
| 3,354,370 | 11/1967 | Corry et al. | 318/227 |
| 3,568,021 | 3/1971 | Turnbull | 321/5 |
| 3,656,047 | 4/1972 | Yarema et al. | 321/5 |
| 3,555,397 | 1/1971 | Frank | 321/5 |

Primary Examiner—William M. Shoop, Jr.
Attorney—Eugene W. Christen et al.

[57] ABSTRACT

A three-stage shift register circuit, responsive to the output signals of a variable frequency oscillator, produces a repeating series of six equally spaced electrical timing signals. A differentiating circuit corresponding to each electrical timing signal is responsive to the leading edge of each corresponding electrical timing signal to produce a corresponding gate signal pulse. Each gate signal pulse is amplified by a corresponding amplifier, the output of which is connected across the primary winding of a pulse transformer having three secondary windings, a respective secondary winding of each pulse transformer is connected across the gate-cathode electrodes of each the extinguishing silicon controlled rectifier of a three-phase inverter circuit through which a three-phase motor may be energized from a direct current supply potential source which corresponds to the inverter silicon controlled rectifier to be extinguished, the inverter silicon controlled rectifier next to be triggered conductive and the inverter silicon controlled rectifier last triggered conductive.

4 Claims, 3 Drawing Figures

INVENTORS
Joseph A. Riess &
BY Conrad P. Vespie

Richard G. Stehr
ATTORNEY

THREE-PHASE INVERTER CONTROL CIRCUIT

This invention is directed to a three-phase inverter control circuit and, more specifically, to a three-phase inverter control circuit which supplies two electrical gate-cathode power pulses across the gate-cathode electrodes of the inverter silicon controlled rectifiers and a single electrical gate-cathode power pulse across the extinguishing silicon controlled rectifiers of a three-phase inverter circuit in the proper sequence to provide for the energization of a three-phase alternating current motor from a direct current supply potential source.

There are two basic methods of isolating the gate-cathode circuits of the silicon controlled rectifiers of an inverter circuit. One method is to employ isolated trigger circuits, each of which has its own power supply, connected directly across the gate-cathode electrodes of each inverter silicon controlled rectifier and each extinguishing silicon controlled rectifier of the three-phase inverter circuit. However, this method is rather cumbersome and requires a multiplicity of separate gate circuit power supplies. Another method is to connect the gate-cathode circuit of each of the inverter silicon controlled rectifiers and the corresponding extinguishing silicon controlled rectifiers to a single gate-cathode power supply through respective pulse transformers. However, it is difficult to obtain a sufficient pulse width with the proper rise time to maintain the inverter silicon controlled rectifiers conductive into an inductive circuit throughout the conduction period. To eliminate this disadvantage, two gate-cathode power pulses may be applied across the gate-cathode electrodes of each inverter silicon controlled rectifier during each conduction period.

It is, therefore, an object of this invention to provide an improved three-phase inverter control circuit.

It is another object of this invention to provide an improved three-phase inverter control circuit wherein two gate-cathode power pulses are applied across the gate-cathode electrodes of each inverter silicon controlled rectifier of a three-phase inverter circuit during each conduction period.

In accordance with this invention, a three-phase inverter control circuit is provided wherein a repeating series of six equally spaced electrical timing signals are produced in response to a variable frequency oscillator and the leading edge of each is differentiated in a corresponding differentiating circuit to produce a series of gate signal pulses which are amplified through the primary winding of respective pulse transformers having three secondary windings, a respective one of which is connected across the gate-cathode electrodes of each of the inverter circuit extinguishing silicon controlled rectifiers corresponding to the inverter silicon controlled rectifier to be extinguished, the inverter silicon controlled rectifier next to be triggered conductive and the inverter silicon controlled rectifier last triggered conductive.

Figure 2:
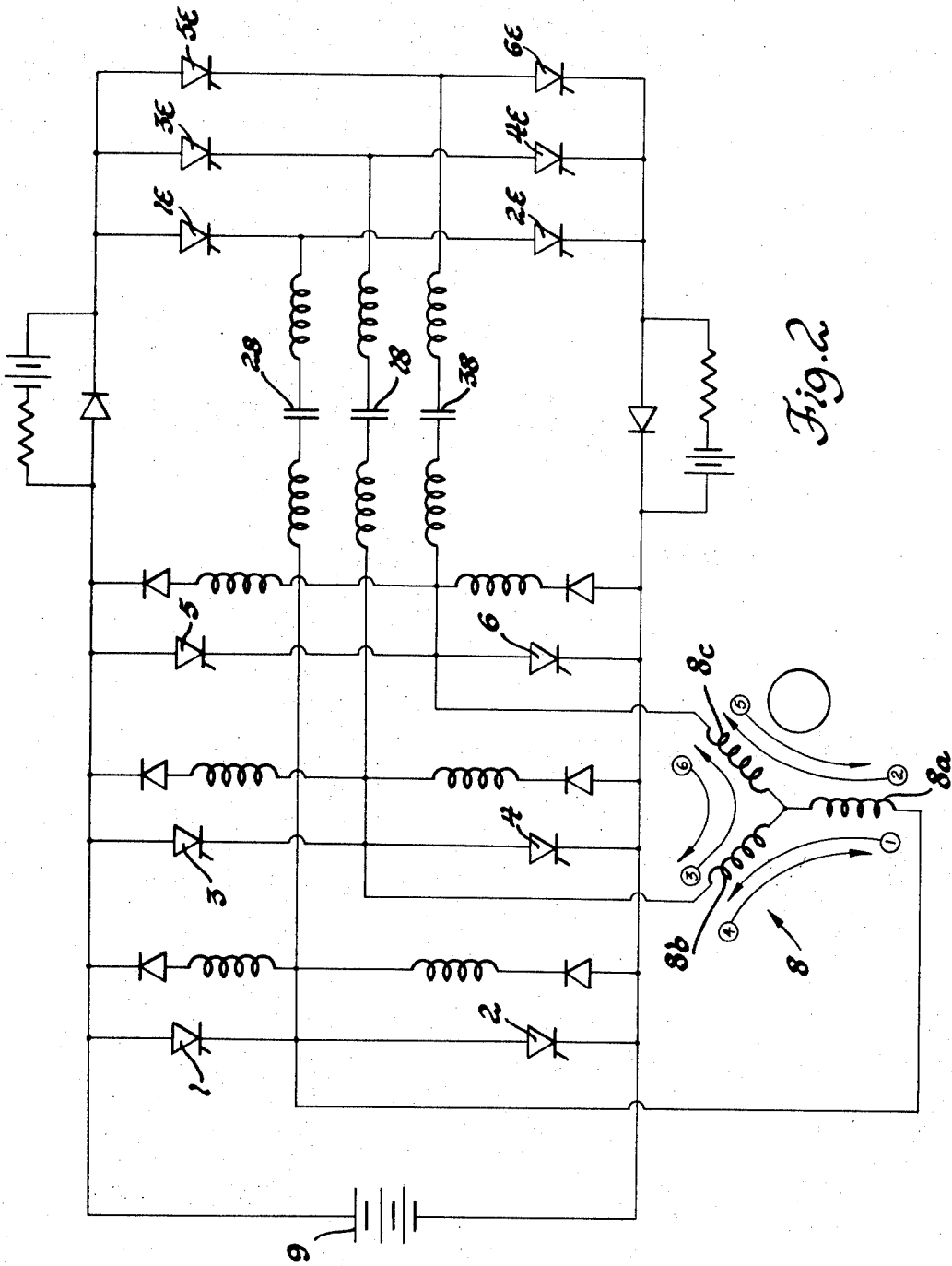
Figure 3:
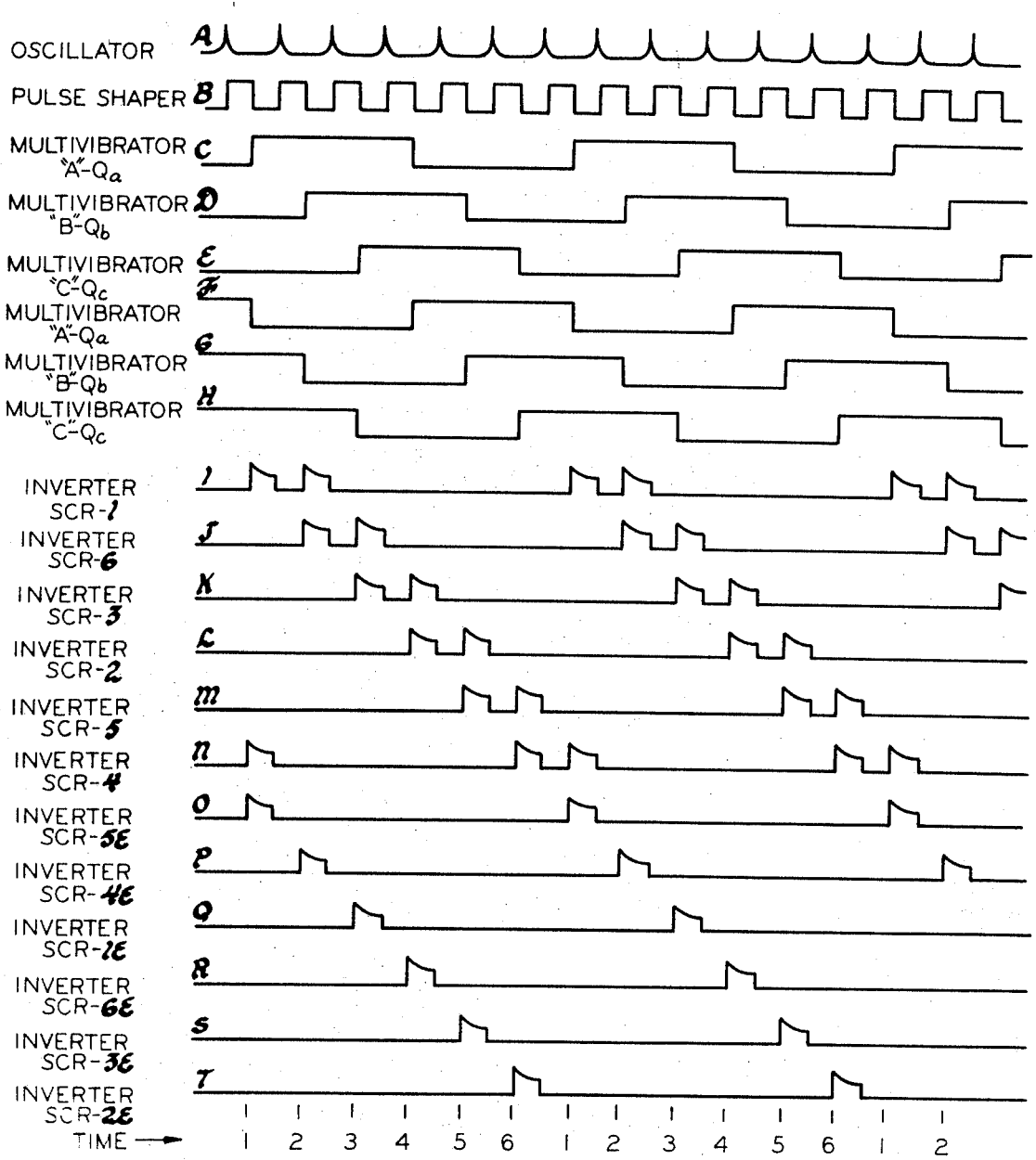

For a better understanding of the present invention, together with additional objects, advantages and features thereof, reference is made to the following description and accompanying drawings in which:

FIG. 1 sets forth the three-phase inverter control of this invention in schematic form, FIG. 2 is a schematic diagram of a three-phase inverter circuit suitable for use with the inverter control circuit of this invention, and FIG. 3 is a set of curves useful in understanding the three-phase inverter control circuit of FIG. 1.

As point of reference or ground potential is the same point electrically throughout the system, it has been represented in FIG. 1 by the accepted schematic symbol and referenced by the numeral 7.

The three-phase inverter control circuit of this invention produces gate-cathode power signals for the inverter and corresponding extinguishing silicon controlled rectifiers, each having gate, anode and cathode electrodes, of a three-phase inverter circuit and applies the gate-cathode power signals to the extinguishing and inverter silicon controlled rectifiers in the proper sequence to energize the phase windings of a three-phase alternating current motor from a direct current supply potential source.

In FIG. 2 of the drawing, a three-phase inverter circuit through which a three-phase alternating current motor 8 having three wye connected phase windings 8a, 8b and 8c may be energized from a direct current supply potential source, which may be a battery 9, is set forth in schematic form. This three-phase inverter circuit is described in detail in U.S. Pat. No. 3,354,370, Corry et al, November 21, 1967, and is assigned to the same assignee as is the present application. Consequently, the operation of this three-phase inverter circuit will be described only briefly in this specification. To operate motor 8 from battery 9 through the three-phase inverter circuit of FIG. 2, the phase windings thereof may be cyclically energized in the manner as illustrated in FIG. 2 wherein motor phase winding energizing current is illustrated by elongated arrows for six sequential conduction periods numbered 1 through 6 which complete 360 electrical degrees of motor energization. During the first conduction period, motor phase windings 8a and 8b are energized by a motor phase winding energizing current flowing through inverter silicon controlled rectifier 1 into phase winding 8a and out of phase winding 8b through inverter silicon controlled rectifier 4; during the second conduction period, inverter silicon controlled rectifier 4 is extinguished by the charge upon capacitor 18 applied in an inverse polarity relationship across the anode-cathode electrode thereof through extinguishing silicon controlled rectifier 4E and motor phase windings 8a and 8c are energized by a motor phase winding energizing current flowing through inverter silicon controlled rectifier 1 into phase winding 8a and out of phase winding 8c through inverter silicon controlled rectifier 6; during the third conduction period, inverter silicon controlled rectifier 1 is extinguished by the charge upon capacitor 28 applied in an inverse polarity relationship across the anode-cathode electrodes thereof through extinguishing silicon controlled rectifier 1E and motor phase windings 8b and 8c are energized by a motor phase winding energizing current flowing through inverter silicon controlled rectifier 3 into phase winding 8b and out of phase winding 8c through inverter silicon controlled rectifier 6; during the fourth conduction period, inverter silicon controlled rectifier 6 is extinguished by the charge upon capacitor 38 applied in an inverse polarity relationship across the anode-cathode electrodes thereof through extinguishing silicon controlled rectifier 6E and motor phase windings 8b and 8a are energized by a motor phase winding energizing current flowing through inverter silicon controlled rectifier 3 into phase winding 8b and out of phase winding 8a through inverter silicon controlled rectifier 2; during the fifth conduction period, inverter silicon controlled rectifier 3 is extinguished by the charge upon capacitor 18 applied in an inverse polarity relationship across the anode-cathode electrodes thereof through extinguishing silicon controlled rectifier 3E and motor phase windings 8c and 8a are energized by a motor phase winding energizing current flowing through inverter silicon controlled rectifier 5 into phase winding 8c and out of phase winding 8a through inverter silicon controlled rectifier 2 and during the sixth conduction period, inverter silicon controlled rectifier 2 is extinguished by the charge upon capacitor 28 applied in an inverse polarity relationship across the anode-cathode electrodes thereof through extinguishing silicon controlled rectifiers 2E and motor phase windings 8c and 8b are energized by a motor phase winding energizing current flowing through inverter silicon controlled rectifier 5 into phase winding 8c and out of phase winding 8b through inverter silicon controlled rectifier 4. This completes 360 electrical degrees of motor energization as, during the next conduction period, inverter silicon controlled rectifier 5 is extinguished by the charge upon capacitor 38 applied in an inverse polarity relationship across the anode-cathode electrodes thereof through extinguishing silicon controlled rectifier 5E and motor phase windings 8a and 8b are again energized by a motor phase winding energizing current flowing through inverter silicon controlled rectifier 1 into phase winding 8a and out of phase winding 8b through inverter silicon controlled rectifier 4.

The three-phase inverter control circuit of this invention, schematically set forth in FIG. 1, produces the proper inverter and extinguishing silicon controlled rectifier gate-cathode power pulses and applies them across the gate-cathode electrodes of the inverter and extinguishing silicon controlled rectifiers of the three-phase inverter circuit in the proper sequence to energize the phase windings of motor 8 in the sequence described in the previous paragraph.

A variable frequency oscillator 19 produces a series of electrical pulses, as shown in FIG. 3A, which may be shaped by a conventional pulse shaper 29 to provide a series of square wave form electrical pulses, as shown in FIG. 3B. As each variable frequency oscillator 19 and pulse shaper 29 may be any one of the many conventional variable frequency oscillators and pulse shapers well known in the art and, per se, form no part of this invention, each has been indicated in FIG. 1 in block form.

Circuitry responsive to the output signals of the variable frequency oscillator for producing a repeating series of six equally spaced electrical timing signals is provided. One example, and without intention or inference of a limitation thereto, of this circuitry is a three-stage shift register circuit 39 comprised of three J-K flip-flop circuits A, B and C, each having a J, a K and a C, or clock, input terminal and Q and $\overline{Q}$ output terminals, interconnected as shown in FIG. 1 with the output signals produced by variable frequency oscillator 19 applied to the C input terminal of all of the J-K flip-flop circuits in parallel. As J-K flip-flop circuits are commercially available and well known in the art, each has been illustrated in block form in FIG. 1. One example of a J-K flip-flop circuit suitable for this application is a type MC 663 marketed by Motorola Semiconductor Products, Inc. The repeating series of six equally spaced electrical timing signals produced by the three-stage shift register circuit 39 are set forth in FIGS. 3C, 3D, 3E, 3F, 3G and 3H.

The leading edge of each of these six timing signals marks the beginning of a conduction period of the inverter silicon controlled rectifiers. Consequently, circuitry responsive to the leading edge of each of these six electrical timing signals for producing a corresponding gate signal pulse is provided. This circuitry may be a differentiating circuit corresponding to each electrical timing signal. In FIG. 1 the differentiating circuit corresponding to the electrical timing signal produced upon output $Q_a$ by J-K flip-flop A is comprised of capacitor 11 and resistor 12; the differentiating circuit corresponding to the electrical timing signal produced upon output terminal $Q_b$ of J-K flip-flop B is comprised of capacitor 21 and resistor 22; the differentiating circuit corresponding to the electrical timing signal produced upon output terminal $Q_c$ of J-K flip-flop C is comprised of capacitor 31 and resistor 32; the differentiating circuit corresponding to the electrical timing signal produced upon output terminal $\overline{Q}_a$ of J-K flip-flop A is comprised of capacitor 41 and resistor 42; the differentiating circuit corresponding to the electrical timing signal produced upon output terminal $\overline{Q}_b$ of J-K flip-flop B is comprised of a capacitor 51 and resistor 52; and the differentiating circuit corresponding to the electrical timing signal produced upon output terminal $\overline{Q}_c$ of J-K flip-flop C is comprised of capacitor 61 and resistor 62.

An amplifier circuit corresponding to each electrical timing signal is provided for amplifying the gate signal pulses corresponding to the same electrical timing signal is provided. One example of an amplifier suitable for use with the circuit of this invention is detailed in FIG. 1 and comprises a type NPN transistor 10 and the associated bias circuitry. The collector-emitter electrodes of transistor 10 are connected across the positive and negative output terminals of a battery 48 through a collector resistor 49 and point of reference or ground potential 7, respectively. Consequently, the collector-emitter electrodes of type NPN transistor 10 are poled for forward conduction therethrough across battery 48. With each leading edge of the electrical timing signal produced upon output terminal $Q_a$ of J-K flip-flop A, a gate signal pulse appears across junction 70 and ground 7 of a wave form as shown in FIG. 1. During the positive polarity excursion of each gate signal pulse, base-emitter and, consequently, collector-emitter current flows through type NPN transistor 10. Connected across the output circuit of transistor 10, the emitter-base electrodes, is the primary winding 14 of a pulse transformer 13. The pulse of current flow through primary winding 14 in response to each gate signal pulse induces a corresponding gate-cathode power pulse in each of secondary windings 15, 16 and 17 of pulse transformer 13. That is, amplifier 10 and pulse transformer 13 are responsive to each gate signal pulse appearing across junction 70 and point of reference or ground potential 7 to produce three gate-cathode power pulses. As the amplifier circuit corresponding to each of the other five electrical timing signals may be identical in every respect to amplifier circuit 10, in the interest of reducing drawing complexity, the amplifier circuit corresponding to each of the other five electrical timing signals have been illustrated in FIG. 1 in block form and have been referenced by the numerals 20, 30, 40, 50 and 60, respectively. Connected across the output circuit of the amplifier circuit corresponding to each of these other five electrical timing signals is, respectively, the primary winding 24 of pulse transformer 23, primary winding 34 of pulse transformer 33, primary winding 44 of pulse transformer 43, primary winding 54 of pulse transformer 53 and primary winding 64 of pulse transformer 63.

Each of pulse transformers 13, 23, 33, 43, 53 and 63 has three secondary windings, one of which is connected across the gate-cathode electrodes of each the extinguishing silicon controlled rectifier corresponding to the inverter silicon controlled rectifier to be extinguished, the inverter silicon controlled rectifier next to be triggered conductive and the inverter silicon controlled rectifier last triggered conductive. For example, during conduction period two, the beginning of which is marked by the leading edge of the electrical timing signal produced upon the $Q_b$ output terminal of J-K flip-flop b, inverter silicon controlled rectifier 4 is to be extinguished, inverter silicon controlled rectifier 6 is next to be triggered conductive and inverter silicon controlled rectifier 1, which was conducting during the first period of conduction, was the last to be triggered conductive. Therefore, secondary winding 25 of pulse transformer 23 is connected across the gate-cathode electrodes of extinguishing silicon controlled rectifier 4E which applies the charge upon capacitor 38 in an inverse polarity relationship across the anode-cathode electrodes of inverter silicon controlled rectifier 4, secondary winding 26 is connected across the gate-cathode electrodes of inverter silicon controlled rectifier 6, the next inverter silicon controlled rectifier to be triggered conductive to provide for the energization of phase windings 8a and 8c of motor 8 and secondary winding 27 is connected across the gate-cathode electrodes of inverter silicon controlled rectifier 1, the inverter silicon controlled rectifier last triggered conductive during the first conduction period to provide for the energization of motor phase windings 8a and 8b.

During the first conduction period, the leading edge of the electrical timing signal produced upon the $Q_a$ output terminal of J-K flip-flop A is converted into a gate signal pulse by the corresponding integrating circuit comprising capacitor 11 and resistor 12. In response to this gate signal pulse, amplifier 10 and pulse transformer 13 produce three gate-cathode power pulses, one in each of secondary windings 15, 16 and 17. The gate-cathode power pulse of secondary winding 17 is connected across gate-cathode electrodes of extinguishing silicon controlled rectifier 5E which corresponds to the inverter silicon controlled rectifier 5 to be extinguished; the gate-cathode power pulse of secondary winding 15 is connected across the gate-cathode electrodes of inverter silicon controlled rectifier 1, next to be triggered conductive, and the gate-cathode power pulse secondary winding 16 is connected across the gate-cathode electrodes of inverter silicon controlled rectifier 4, the last inverter silicon controlled rectifier triggered conductive, to trigger these devices conductive through the anode-cathode electrodes. Conducting extinguishing silicon controlled rectifier 5E applies the charge upon capacitor 38 in an inverse polarity relationship across inverter silicon controlled rectifier 5 to extinguish this device and conducting inverter silicon controlled rectifiers 1 and 4 complete an energizing circuit for the flow of phase current through phase windings 8a and 8b of motor 8 into phase winding 8a through conducting inverter silicon controlled rectifier 1 and out of phase winding 8b through conducting inverter silicon controlled rectifier 4.

During the second conduction period, the leading edge of the electrical timing signal produced upon the $Q_b$ output terminal of J-K flip-flop B is converted into a gate signal pulse by the corresponding integrating circuit comprising capacitor 21 and resistor 22. In response to this gate signal pulse, amplifier 20 and pulse transformer 23 produce three gate-cathode power pulses, one in each of secondary windings 25, 26 and 27. The gate-cathode power pulse of secondary winding 27 is connected across gate cathode electrodes of extinguishing silicon controlled rectifier 4E which corresponds to the inverter silicon controlled rectifier 4 to be extinguished, gate-cathode power pulse of secondary winding 26 is connected across the gate-cathode electrodes of inverter silicon controlled rectifier 6, next to be triggered conductive, and the gate-cathode power pulse of secondary winding 25 is connected across the gate-cathode electrodes of inverter silicon controlled rectifier 1, the last inverter silicon controlled rectifier triggered conductive, to trigger these devices conductive through the anode-cathode electrodes. Conducting extinguishing silicon controlled rectifier 4E applies the charge upon capacitor 18 in an inverse polarity relationship across inverter silicon controlled rectifier 4 to extinguish this device and conducting inverter silicon controlled rectifiers 1 and 6 complete an energizing circuit for the flow of phase current through phase windings 8a and 8c of motor 8 into phase winding 8a through conducting inverter silicon controlled rectifier 1 and out of phase winding 8a through conducting inverter silicon controlled rectifier 6.

During the third conduction period, the leading edge of the electrical timing signal produced upon the $Q_c$ output terminal of J-K flip-flop C is converted into a gate signal pulse by the corresponding integrating circuit comprising capacitor 31 and resistor 32. In response to this gate signal pulse, amplifier 30 and pulse transformer 33 produce three gate-cathode power pulses, one in each of secondary windings 35, 36 and 37. The gate-cathode power pulse of secondary winding 37 is connected across gate-cathode electrodes of extinguishing silicon controlled rectifier 1E which corresponds to the inverter silicon controlled rectifier 1 to be extinguished, gate-cathode power pulse of secondary winding 36 is connected across the gate-cathode electrodes of inverter silicon controlled rectifier 3 next to be triggered conductive and the gate-cathode power pulse of secondary winding 35 is connected across the gate-cathode electrodes of inverter silicon controlled rectifier 6, the last inverter silicon controlled rectifier triggered conductive, to trigger these devices conductive through the anode-cathode electrodes. Conducting extinguishing silicon controlled rectifier 1E applies the charge upon capacitor 28 in an inverse polarity relationship across inverter silicon controlled rectifier 1 to extinguish this device and conducting inverter silicon controlled rectifiers 3 and 6 complete an energizing circuit for the flow of phase current through phase windings 8b and 8c of motor 8 into phase winding 8b through conducting inverter silicon controlled rectifier 3 and out of phase winding 8c through conducting inverter silicon controlled rectifier 6.

During the fourth conduction period, the leading edge of the electrical timing signal produced upon the $\overline{Q}_a$ output terminal of J-K flip-flop A is converted into a gate signal pulse by the corresponding integrating circuit comprising capacitor 41 and resistor 42. In response to this gate signal pulse, amplifier 40 and pulse transformer 43 produce three gate-cathode power pulses, one in each of secondary windings 45, 46 and 47. The gate-cathode power pulse of secondary winding 47 is connected across gate-cathode electrodes of extinguishing silicon controlled rectifier 6E which corresponds to the inverter silicon controlled rectifier 6 to be extinguished, gate-cathode power pulse of secondary winding 46 is connected across the gate-cathode electrodes of inverter silicon controlled rectifier 2 next to be triggered conductive and the gate-cathode power pulse of secondary winding 45 is connected across the gate-cathode electrodes of inverter silicon controlled rectifier 3, the last inverter silicon controlled rectifier triggered conductive, to trigger these devices conductive through the anode-cathode electrodes. Conducting extinguishing silicon controlled rectifier 6E applies the charge upon capacitor 38 in an inverse polarity relationship across inverter silicon controlled rectifier 6 to extinguish this device and conducting inverter silicon controlled rectifiers 3 and 2 complete an energizing circuit for the flow of phase current through phase windings 8b and 8a of motor 8 into phase winding 8b through conducting inverter silicon controlled rectifier 3 and out of phase winding 8a through conducting inverter silicon controlled rectifier 2.

During the fifth conduction period, the leading edge of the electrical timing signal produced upon the $\overline{Q}_b$ output terminal of J-K flip-flop B is converted into a gate signal pulse by the corresponding integrating circuit comprising capacitor 51 and resistor 52. In response to this gate signal pulse, amplifier 50 and pulse transformer 53 produce three gate-cathode power pulses, one in each of secondary windings 55, 56 and 57. The gate-cathode power pulse of secondary winding 57 is connected across gate-cathode electrodes of extinguishing silicon controlled rectifier 3E which corresponds to the inverter silicon controlled rectifier 3 to be extinguished, gate-cathode power pulse of secondary winding 56 is connected across the gate-cathode electrodes of inverter silicon controlled rectifier 5 next to be triggered conductive and the gate-cathode power pulse of secondary winding 55 is connected across the gate-cathode electrodes of inverter silicon controlled rectifier 2, the last inverter silicon controlled rectifier triggered conductive, to trigger these devices conductive through the anode-cathode electrodes. Conducting extinguishing silicon controlled rectifier 3E applies the charge upon capacitor 18 in an inverse polarity relationship across inverter silicon controlled rectifier 3 to extinguish this device and conducting inverter silicon controlled rectifiers 5 and 2 complete an energizing circuit for the flow of phase current through phase windings 8c and 8a of motor 8 into phase winding 8c through conducting inverter silicon controlled rectifier 5 and out of phase winding 8a through conducting inverter silicon controlled rectifier 2.

During the sixth conduction period, the leading edge of the electrical timing signal produced upon the $Q_c$ output terminal of J-K flip-flop C is converted into a gate signal pulse by the corresponding integrating circuit comprising capacitor 61 and resistor 62. In response to this gate signal pulse, amplifier 60 and pulse transformer 63 produce three gate-cathode power pulses, one in each of secondary windings 65, 66 and 67. The gate-cathode power pulse of secondary winding 67 is connected across gate-cathode electrodes of extinguishing silicon controlled rectifier 2E which corresponds to the inverter silicon controlled rectifier 2 to be extinguished, gate-cathode power pulse of secondary winding 66 is connected across the gate-cathode electrodes of inverter silicon controlled rectifier 4 next to be triggered conductive and the gate-cathode power pulse of secondary winding 65 is connected across the gate-cathode electrodes of inverter silicon controlled rectifier 5, the last inverter silicon controlled rectifier triggered conductive, to trigger these devices conductive through the anode-cathode electrodes. Conducting extinguishing silicon controlled rectifier 2E applies the charge upon capacitor 28 in an inverse polarity relationship across inverter silicon controlled rectifier 2 to extinguish this device and conducting inverter silicon controlled rectifiers 5 and 4 complete an energizing circuit for the flow of phase current through phase windings 8c and 8b of motor 8 into phase winding 8c through conducting inverter silicon controlled rectifier 5 and out of phase winding 8b through conducting inverter silicon controlled rectifier 4.

Diodes 71, 72, 73, 74, 75 and 76 of FIG. 1 suppress the negative polarity spike of the gate signal pulses and diodes 77, 78, 79, 80, 81 and 82 are free-wheeling diodes which dissipate the energy in the corresponding pulse transformer primary windings upon the interruption of the energizing circuit therefor.

FIGS. 3I through 3T, inclusive, illustrate the gate-cathode power pulses applied to the inverter and extinguishing silicon controlled rectifiers.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A three-phase inverter control circuit for producing gate-cathode trigger signals for the inverter and corresponding extinguishing silicon controlled rectifiers, each having gate, anode and cathode electrodes, of a three-phase inverter circuit and applying the trigger signals to the extinguishing and inverter silicon controlled rectifiers in the proper sequence to energize the phase windings of a three-phase alternating current motor from a direct current supply potential source comprising, a variable frequency oscillator, means responsive to the output signals of said variable frequency oscillator for producing a repeating series of six equally spaced electrical timing signals, means responsive to the leading edge of each of said electrical timing signals for producing a corresponding gate signal pulse, means responsive to each of said gate signal pulses for producing three gate-cathode power pulses, and means for applying a respective one of said gate-cathode power pulses across said gate-cathode electrodes of each the said extinguishing silicon controlled rectifier corresponding to the said inverter silicon controlled rectifier to be extinguished, the said inverter silicon controlled rectifier next to be triggered conductive and the said inverter silicon controlled rectifier last triggered conductive.

2. A three-phase inverter control circuit for producing gate-cathode trigger signals for the inverter and corresponding extinguishing silicon controlled rectifiers, each having gate, anode and cathode electrodes, of a three-phase inverter circuit and applying the trigger signals to the extinguishing and inverter silicon controlled rectifiers in the proper sequence to energize the phase windings of a three-phase alternating current motor from a direct current supply potential source comprising, a variable frequency oscillator, a shift register circuit responsive to the output signals of said variable frequency oscillator for producing a repeating series of six equally spaced electrical timing signals, means responsive to the leading edge of each of said electrical timing signals for producing a corresponding gate signal pulse, means responsive to each of said gate signal pulses for producing three gate-cathode power pulses, and means for applying a respective one of said gate-cathode power pulses across said gate-cathode electrodes of each the said extinguishing silicon controlled rectifier corresponding to the said inverter silicon controlled rectifier to be extinguished, the said inverter silicon controlled rectifier next to be triggered conductive and the said inverter silicon controlled rectifier last triggered conductive.

3. A three-phase inverter control circuit for producing gate-cathode trigger signals for the inverter and corresponding extinguishing silicon controlled rectifiers, each having gate, anode and cathode electrodes, of a three-phase inverter circuit and applying the trigger signals to the extinguishing and inverter silicon controlled rectifiers in the proper sequence to energize the phase windings of a three-phase alternating current motor from a direct current supply potential source comprising, a variable frequency oscillator, means responsive to the output signals of said variable frequency oscillator for producing a repeating series of six equally spaced electrical timing signals, a differentiating circuit responsive to the leading edge of each of said electrical timing signals for producing a corresponding gate signal pulse, means responsive to each of said gate signal pulses for producing three gate-cathode power pulses, and means for applying a respective one of said gate-cathode power pulses across said gate-cathode electrodes of each the said extinguishing silicon controlled rectifier corresponding to the said inverter silicon controlled rectifier to be extinguished, the said inverter silicon controlled rectifier next to be triggered conductive and the said inverter silicon controlled rectifier last triggered conductive.

4. A three-phase inverter control circuit for producing gate-cathode trigger signals for the inverter and corresponding extinguishing silicon controlled rectifiers, each having gate, anode and cathode electrodes, of a three-phase inverter circuit and applying the trigger signals to the extinguishing and inverter silicon controlled rectifiers in the proper sequence to energize the phase windings of a three-phase alternating current motor from a direct current supply potential source comprising, a variable frequency oscillator, a shift register circuit responsive to the output signals of said variable frequency oscillator for producing a repeating series of six equally spaced electrical timing signals, a differentiating circuit corresponding to each said electrical timing signal responsive to the leading edge of each of said electrical timing signals for producing a corresponding trigger signal pulse, an amplifier circuit having an output circuit corresponding to each said electrical timing signal for amplifying the said trigger signal pulses corresponding to the same said electrical timing signal, and a pulse transformer having a primary winding connected across said output circuit of each said amplifier and three secondary windings, one of which is connected across said gate-cathode electrodes of each the said extinguishing silicon controlled rectifier corresponding to the said inverter silicon controlled rectifier to be extinguished, the said inverter silicon controlled rectifier next to be triggered conductive and the said inverter silicon controlled rectifier last triggered conductive.

* * * * *